(12) United States Patent
Govorkov et al.

(10) Patent No.: US 6,393,040 B1
(45) Date of Patent: May 21, 2002

(54) MOLECULAR FLUORINE ($F_2$) EXCIMER LASER WITH REDUCED COHERENCE LENGTH

(75) Inventors: Sergei V. Govorkov, Boca Raton, FL (US); Uwe Stamm, Gottingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/482,698

(22) Filed: Jan. 13, 2000

Related U.S. Application Data
(60) Provisional application No. 60/121,350, filed on Feb. 24, 1999.

(51) Int. Cl.[7] .................................................. H01S 3/13
(52) U.S. Cl. ...................... 372/29.014; 372/57; 372/19; 372/20; 372/31; 372/98; 372/99; 372/102
(58) Field of Search .............................. 372/57, 19, 20, 372/29.014, 31, 26, 99, 98, 102

(56) References Cited

U.S. PATENT DOCUMENTS

| | | | |
|---|---|---|---|
| 3,868,592 A | 2/1975 | Yarborough et al. | 331/94.5 |
| 4,393,505 A | 7/1983 | Fahlen | 372/57 |
| 4,399,540 A | 8/1983 | Bücher | 372/20 |
| 4,696,012 A | 9/1987 | Harshaw | 372/99 |
| 4,829,536 A | 5/1989 | Kajiyama et al. | 372/57 |
| 4,856,018 A | 8/1989 | Nozue et al. | 372/98 |
| 4,873,692 A | 10/1989 | Johnson et al. | 372/20 |
| 4,905,243 A | 2/1990 | Lokai et al. | 372/32 |
| 4,972,429 A | 11/1990 | Herbst | 372/100 |
| 4,975,919 A | 12/1990 | Amada et al. | 372/33 |
| 4,977,563 A | 12/1990 | Nakatani et al. | 372/32 |
| 5,081,635 A | 1/1992 | Wakabayashi et al. | 372/57 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,226,050 A | 7/1993 | Burghardt | 372/20 |
| 5,404,366 A | 4/1995 | Wakabayashi et al. | 372/29 |
| 5,559,816 A | 9/1996 | Basting et al. | 372/27 |
| 5,596,456 A | 1/1997 | Luecke | 359/831 |
| 5,596,596 A | 1/1997 | Wakabayashi et al. | 372/102 |

(List continued on next page.)

OTHER PUBLICATIONS

*Optics and Laser Technology*, vol. 11, No. 6, Dec. 1979, "CIF and $F_2$: two new ultra–violet laser systems," K. Hohla, M. Diegelmann, H. Pummer, K.L. Kompa, 6 pgs.

*Applied Physics B Photo–physics and Laser Chemistry*, vol. B55, No. 1, Jul. 1992, "Influence of Cavity Configuration on the Pulse Energy of a High–Pressure Molecular Fluorine Laser," S.M. Hooker, A.M. Haxell, and C.E. Webb, 6 pgs.

*Highlights Lambdaphysik*, Apr. 1993, "Excimer laser based microstructuring using mask projection techniques," U. Sarbach and H.J. Kahlert, 4 pgs.

"High–power efficient vacuum ultraviolet $F_2$ laser excited by an electric discharge," V.N. Ishchenko et al., *Sov. J. of Quant. El.*, vol. 16, No. 5, Am. Inst. of Phy., May 1986, 3 pgs.

*Conference on Lasers and Electro–optics*, 1990 Technical Digest Series, vol. 7, May 21–25, 1990, Anaheim, Califorina, "Spectroscopic comparison between low and high pressure discharge pumped Xe atomic lasers," K. Komatsu, E. Matsui, S. Takahashi, Fumiko Kannari, M. Obara, 30 pgs.

*Primary Examiner*—Leon Scott, Jr.
(74) *Attorney, Agent, or Firm*—Sierra Patent Group, Ltd.; Andrew V. Smith

(57) ABSTRACT

A molecular fluorine ($F_2$) laser is provided wherein the gas mixture includes molecular fluorine for generating an emission spectrum including two or three closely spaced lines around 157 nm. An optical method and means are provided for selecting an emission line from among the plurality of closely spaced emission lines of the molecular fluorine laser gas volume and broadening the spectrum of said selected emission line. This approach of broadening the spectrum reduces the coherence length of the output beam. As a result, speckle may be reduced or avoided in microlithography applications.

62 Claims, 7 Drawing Sheets

U.S. PATENT DOCUMENTS

| | | | |
|---|---|---|---|
| 5,646,954 A | | 7/1997 | Das et al. .................... 372/55 |
| 5,659,419 A | | 8/1997 | Lokai et al. ................ 359/330 |
| 5,663,973 A | | 9/1997 | Stamm et al. ................ 372/20 |
| 5,684,822 A | | 11/1997 | Partlo ......................... 372/95 |
| 5,724,164 A | * | 3/1998 | Lowenbar et al. .......... 372/102 |
| 5,761,236 A | | 6/1998 | Kleinschmidt et al. ..... 372/100 |
| 5,802,094 A | | 9/1998 | Wakabayashi et al. ........ 372/57 |
| 5,835,520 A | | 11/1998 | Das et al. .................... 372/57 |
| 5,852,627 A | | 12/1998 | Ershov ....................... 372/108 |
| 5,856,991 A | * | 1/1999 | Ershov ......................... 372/57 |
| 5,898,725 A | | 4/1999 | Fomenkov et al. ......... 372/102 |
| 5,901,163 A | * | 5/1999 | Ershov ......................... 372/20 |
| 5,917,849 A | | 6/1999 | Ershov ....................... 372/102 |
| 5,946,337 A | | 8/1999 | Govorkov et al. ........... 372/92 |
| 5,970,082 A | | 10/1999 | Ershov ....................... 372/102 |
| 5,978,409 A | | 11/1999 | Das et al. ................... 372/100 |
| 5,999,318 A | | 12/1999 | Morton et al. .............. 359/572 |
| 6,025,939 A | * | 2/2000 | Lowenbar et al. .......... 372/102 |
| 6,028,879 A | * | 2/2000 | Ershov ......................... 372/98 |
| 6,240,110 B1 | * | 5/2001 | Ershov ......................... 372/20 |

OTHER PUBLICATIONS

*Applied Physics Letters*, vol. 56, Jun. 25, 1990, No. 26, "High specific output energy operation of a vacuum ultraviolet molecular fluorine laser excited at 66 MW/cm$^3$ by an electric discharge," Masayuki Kakehata, Etsu Hashimoto, Fumihiko Kannari and Minoru Obara, 6 pgs.

*Journal of Applied Physics*, vol. 50, Jun. 1979, No. 6, "Novel neutral atomic fluorine laser lines in a high–pressure mixture of $F_2$ and He," Shin Sumida, Minoru Obara, and Tomoo Fujioka, 10 pgs.

*IEEE Journal of Quantum Electronics*, Nov. 1991, vol. 27, No. 11, "Efficiency Characterization of Vacuum Ultraviolet Molecular Fluorine ($F_2$) Laser (157 nm) Excited by an Intense Electric Discharge," Masayuki Kakehata, Tatsuya Uematsu, Fumihiko Kannari, and Minoru Obara, 10 pgs.

*Journal of Modern Optics*, vol. 37, No. 4, Apr. 1990, "Amplification characteristics of a discharge excited $F_2$ laser," C. Skordoulis, E. Sarantopoulou, S. Spyrou and A.C. Cefalas, 12 pgs.

*Optics Communications*, vol. 55, No. 6, Oct. 15, 1985, "Gain Measurements at 157 nm in an $F_2$ Pulsed Discharge Molecular Laser," A.C. Cefalas, C. Skordoulis, M. Kompitasas and C.A. Nicolaides, 6 pgs.

*Applied Physics Letters*, vol. 54, Feb. 13, 1989, No. 7, "High–power discharge–pumped $F_2$ molecular laser," Kawakatsu Yamada, Kenzo Miyazaki, Toshifumi Hasama, and Takuzo Sata, 6 pgs.

*Leos '89*, Lasers and Electro–Optics Society Annual Meeting Conference Proceedings, Oct. 17–20, 1989, Orlando, Florida, "High Power Discharge–Pumped $F_2$ Laser," K. Yamada, K. Miyazaki, T. Hasama, T. Sato, M. Kasamatsu, and Y. Mitsuhashi, 13 pgs.

*Journal of Applied Physics*, vol. 53, May 1982, No. 5, "Gain and saturation of the atomic fluorine laser," R. Sadighi–Bonabi, F.W. Lee, and C.B. Collins, 11 pgs.

*Conference on Lasers and Electro–Optics*, 1989 Technical Digest Series, vol. 11, Apr. 24–28, 1989, Baltimore, Maryland, "Intense VUV–XUV generation from rare gas excimers," Wataru Sasaki, Kou Kurosawa, 23 pgs.

*Soviet Journal of Quantum Electronics*, 16(5) May 1986, "High–power efficient vacuum ultraviolet $F_2$ laser excited by an electric discharge," V.N. Ishchenko, S.A. Kochubei, and A.M. Razhev, 9 pgs.

*Optics Communications*, vol. 28, No. 1, Jan. 1979, "Discharge pumped $F_2$ Laser at 1580 Å", H. Pummer, K. Hohla, M. Diegelmann and J.P. Reilly, 6 pgs.

*Gas Flow and Chemical Lasers*, SPIE Vo. 1397, Sep. 10–14, 1990, "Frequency up–conversion of a discharge pumped molecular fluorine laser by stimulated Raman scattering in $H_2$," Masayuki Kakehata, Etsu Hashimoto, Fumihiko Kannari, and Minoru Obara, 16 pgs.

*The Journal of Chemical Physics*, vol. 69, Sep. 15, 1978, "An efficient, high power $F_2$ laser near 157 nm[a]," Joseph R. Woodworth and James K. Rice, 11 pgs.

*Verhandlungen*, Mar. 1990, Phsyikertagung Munchen, 1990, Optimierung der VUV–Emission bei 157 nm ($F_2$–Linie) bei entladungs—gepemten Excimerlasern, F. Voss, 2 pgs.

*Tagungsband*, Vom. 24, Bis. 26, Sep. 1991, Abstract: "Vakuum UV Molekullaser mit hoher Ausgangsleistung," 3 pgs.

*Applied Physics Letters*, vol. 51, No. 13, Sep. 28, 1997, "Theoretical evaluation of high–efficiency operation of discharge–pumped vacuum–ultraviolet $F_2$ lasers," Mieko Ohwa and Minoru Obara, 6 pgs.

*Applied Optics VUV VI*, vol. 19, No. 23, Dec. 1, 1980, "Vacuum ultraviolet excimer lasers," M.H.R. Hutchinson, 9 pgs.

*Review of Scientific Instruments*, vol. 56, No. 5, Part 1, May 1985, "Simple, compact, high–repetition rate XeCI laser," E. Armandillo, G. Grasso, and G. Salvetti, 7 pgs.

*Applied Physics Letters*, vol. 31, No. 1, Jul. 1, 1977, "vuv emissions from mixtures of $F_2$ and the noble gasses—A molecular $F_2$ laser at 1575 Å[a]," James K. Rice, A. Kay Hays, and Joseph R. Woodsworth, 5 pgs.

*Applied Physics Letters*, vol. 63, No. 4, Jul. 26, 1993, "Small–signal gain measurements in an electron beam pumped $F_2$ laser," H.M.J. Bastiaens, B.MN.C. van Dam, P.J.M. Peters, and W. J. Witteman, 7 pgs.

*ZOS*, Akademie der Wissenschaften der DDR, Zentralinstitut fur Optik und Wissenschaften der DDR, Oktober 1987, "Leistungastarker atomarer Fluorlaser im roten Spektralbereich," Jurgen Lademann, Roland Kunig, Wadim Saidow, Rainer Weidauer, 12 pgs.

Discharge–Pumped Excimer Laser Research in Japan, Apr. 1988, "Theoretical simulation of a discharge pumped $F_2$ excimer laser," T. Uematsu et al. Keio U.

*Science Report*, Lambdaphysik, No. 3, Nov. 1990, "Breakthrough in $F_2$Laser Technology," 4 pgs.

Institut Fur Quantenoptik, Oct. 22, 1991, "Stimulated Raman scattering of a $F_2$–Laser in $H_2$," C. Momma, A. Tunnermann, F. Voβ, C. Windolph and B. Wellegehausen, 8 pgs.

*Highlights*, Lambdaphysik, No. 33, Feb. 1992, "VUV Stokes and Anti–Stokes Raman Lines Derived from an $F_2$ Laser," C. Momman, A. Tunermann, F. Voβ, C. Windolph, and B. Wellegehausen, 5 pgs.

*Highlights*, Lambdaphysik, No. 43, Jan. 1994, "Photochemical modification of Fluorocarbon Resin to Generate Adhesive Properties," 6 pgs.

*Highlights Lambdaphysik*, No. 29, Jun. 1991, "VUV Spectroscopy by Frequency Tripling," 6 pgs.

"Processing of PTFE with High Power VUV Laser Radiation," D. Basting, U. Sowada, F. Voβ, P. Oesterlin, 3 pgs.

*Journal of Applied Physics*, vol. 81, No. 6, Mar. 1997, "Small–signal gain measurements in a discharge–pumped $F_2$ laser," Tahei Kitamura, Yoshihiko Arita and Keisuke Maeda, Masayuki Takasaki, Kenshi Nakamura, Yoshiano Fujiwara and Shiro Horiguchi, 12 pgs.

*Journal of Applied Physics*, vol. 77, Jan. 1–15 Jun., 1995, "Long pulse electron beam pumped molecular $F_2$ Laser," F.T.J.L. Lankhorst, H.M.J. Bastiaens, H. Botma, P.J.M. Peters, and W.J. Witteman, 8 pgs.

*Applied Physics*, Vo. B33, No. 4, Apr. 1984, "Intense Laser Generation from an Atomic–Fluorine Laser," I.G. Koprinkov, K.V. Stamenov, and K.A. Stankov, 5 pgs.

*Journal of the Optical Society of America*, vol. 64, No. 4, Apr. 1974, "Modes of a laser resonator containing tilted birefringent plates," Arnold L. Bloom, 7 pgs.

*High Power Laser & Particle Beams*, vol. 6, No. 4, Series No. 24, Nov. 15, 1994.

*SPIE—The International Society for Optical Engineering*, Excimer Beam Applications, vol. 998, Sep. 6, 1988, Boston, Massachusetts, "Narrow–band KrF excimer laser—tunable and wavelength stabilized," Koich Wani, Yoshiro Ogata, Yoshiaki Watarai, Takuhiro Ono, Takeo Miyata, Reiji Sano, and Yasuaki Terui, 10 pgs.

*Conference on Lasers and Electro–Optics*, 1989 Technical Digest Series, vol. 11, Apr. 24–28, 1989, Baltimore, Maryland, "Line–narrowed industrial excimer laser for microlithography," R.K. Brimacombe, T.J. McKee, E.D. Mortimer, B. Norris, J. Reid, T.A. Znotins, 24 pgs.

*Applied Optics*, Aug. 1968, vol. 7, No. 8, "Theory of Multiplate Resonant Reflectors," J.K. Watts, 3 pgs.

*Applied Physics*, 1978, "Nitrogen–Laser–Pumped Single–Mode Dye Laser," S. Saikan, 4 pgs.

*Optics Communications*, vol. 14, No. 1, May 1975, "Electronic Tuning of Dye Lasers by an Electrooptic Birefringent Fabry–Perot Etalon," Masakatsu Okada and Shogo Ieiri, 7 pgs.

M. Kakehata et al., "Experimental Study of Tunability of a Discharge Pumped Molecular Fluorine Laser," Conference on Lasers and Electro–optics, vol. 7, Optical Society of America, May 1990.

A. Bloom, "Modes of a Laser Resonator Containing Tilted Birefringent Plates," Journal of The Optical Society of America, vol. 64, No. 4, Lancaster Press, Apr. 1974.

R.B. Green et al., "Galvanic Detection of O ptical Absorptions in a Gas Discharge," *Applied Physics Letters*, vol. 29, No. 11, Dec. 1, 1976.

R. Sandstrom, "Argon Fluoride Excimer Laser Source For Sub–0.25mm Optical Lithography", *Optical/Laser Microlithography IV*, vol. 1463, 1991.

F. Babin et al., "Ultraviolet Optogalvanic Laser Spectroscopy of Iron for Reference Wavelengths," *Optics Letters*, vol. 12, No. 7, Jul. 1987.

* cited by examiner

MOLECULAR FLUORINE ($F_2$) EXCIMER LASER WITH REDUCED COHERENCE LENGTH

PRIORITY

This Application claims the benefit of U.S. Provisional Application No. 60/121,350, which provisional application was filed Feb. 24, 1999 and is hereby incorporated by reference in its entirety.

RELATED U.S. APPLICATIONS

The subject matter of this Application is related in part to that of the following four U.S. patent applications Ser. No. 09/090,989, filed Jun. 4, 1998; Ser. No. 09/136,353, filed Aug. 18, 1998; Ser. No. 09/317,527, filed May 24, 1999; and Ser. No. 09/317,695, filed May 24, 1999. Said applications relate generally to molecular fluorine lasers with single line selection. U.S. application Ser. No. 09/317,527 also relates generally to line narrowing of the selected emission line and is hereby incorporated by reference in its entirety.

FIELD OF THE INVENTION

The invention relates to a means and method of broadening the spectrum of a single line output beam of a molecular fluorine laser and thereby decreasing the beam's temporal coherence length.

BACKGROUND OF THE INVENTION

Line-narrowed excimer lasers used for microlithography must provide output beams having certain spectral and temporal coherence properties according to the requirements of lithographic imaging systems. The design of the projection optics sets an upper limit to the spectral linewidth of the excimer laser. The design of the illumination optics determines the upper limit of the coherence length and thus the lower limit of the spectral bandwidth of the excimer laser. When the coherence length is longer than a specified minimal length (i.e., the spectral bandwidth is narrower than allowed by the design of the illumination optics), the image on the wafer shows random modulation due to the effect of speckle.

Narrowing of the linewidth of excimer lasers is achieved most commonly through the use of a wavelength selector consisting of prisms and diffraction gratings. In a molecular fluorine laser operating at the wavelength of approximately 157 nm, use of reflective diffraction gratings is limited due to their low reflectivity and the high oscillation threshold inherent with this type of laser.

However, $F_2$ excimer lasers emit light at two or three or more spectral lines, where each line is relatively narrow (on the order of picometers). The present invention provides a means of achieving upper and lower limits on spectral bandwidth output by first, selecting one of these lines and, second, increasing the spectral bandwidth of the selected single line by appropriate means. The increase in the spectral bandwidth is equivalent to a decrease of temporal coherence, thus reducing speckle effects.

BACKGROUND ART

U.S. Pat. No. 5,856,991 describes the use of an optical etalon as an outcoupler, which etalon serves at the same time to line-narrow KrF or ArF excimer lasers. U.S. Pat. 4,977,563 describes the use of a pressure-tuned optical etalon. V. N. Ischenko, S. A. Kochubei, A. M. Razhev, "High-power efficient vacuum ultraviolet laser excited by an electric discharge", Soviet Journal of Quantum Electronics, v.16, pp.707–709, 1986 show molecular fluorescence spectra of fluorine.

SUMMARY OF THE INVENTION

It is an object of the present invention to select an emission line of a molecular fluorine laser and to provide a means and method of broadening the spectrum of the single output beam line and thereby decrease the laser beam's temporal coherence length.

The detailed optical means and method for doing this are described below in relation to each of the various embodiments of the invention.

The spectral bandwidth of a selected emission line is dependent in part on the laser chamber pressure and the reflectivity of the outcoupling mirror, if present. Accordingly, the embodiments below function better when the laser chamber pressure is relatively high and the reflectivity of any outcoupling mirror is also relatively high. As our experience confirms, the spectral bandwidth of the selected laser line increases with increasing chamber pressure; therefore, for all embodiments of the present invention, the laser chamber pressure should preferably be above 2.5 bar.

From the fluorescence spectra of molecular fluorine $F_2$ published elsewhere (see e.g. V. N. Ischenko, S. A. Kochubei, A. M. Razhev, "High-power efficient vacuum ultraviolet laser excited by an electric discharge", Soviet Journal of Quantum Electronics, v. 16, pp.707–709, 1986), it is known that the gain curve for a single line is rather broad in spectral width. Conventionally, excimer lasers employ low reflectivity outcoupling mirrors (reflectivity <8%) because of the high gain of the excimer. This is also the case for the $F_2$ excimer laser. Laser oscillations can only occur in the part of the spectral gain curve in which the gain exceeds the losses. Therefore, increasing the reflectivity of the outcoupling mirror will lead to a broader spectral bandwidth for the single line $F_2$ laser output. Accordingly, for the embodiments of the present invention which have an outcoupling mirror, the reflectivity of the outcoupling mirror should preferably be above 8%. With proper selection of the outcoupler reflectivity and the laser chamber pressure, the spectral bandwidth and therefore the coherence length of the output can be adjusted to meet the requirements of microlithography.

In the first embodiment, line selection is achieved through the use of a dispersive prism. Further line shaping, i.e., spectral broadening of the line, is achieved by using a high reflectivity outcoupling mirror (reflectivity R between 8% and 90%) and a gas pressure in the laser chamber above 2.5 bar.

In the second preferred embodiment, line selection is again achieved through the use of a dispersive prism. Further line shaping, i.e., spectral broadening of the line, is achieved by using a high reflectivity mirror at the other side of the cavity (reflectivity R between 90% and 100%) and a gas pressure in the laser chamber above 2.5 bar. Outcoupling of the laser beam is achieved by reflection at one surface of the prism. The design of the prism, i.e., the angles of the prism as well as the coatings on its surface, can be used to vary the outcoupling ratio.

In the third embodiment, line selection is also achieved through the use of a dispersive prism. Further line shaping, i.e., spectral broadening of the line, is achieved by using an etalon as an outcoupling mirror which is tuned antiresonant to the selected single laser line. Gas pressure in the laser chamber is again above 2.5 bar.

In the fourth preferred embodiment, line selection is again achieved through the use of a dispersive prism. Further line shaping, i.e., spectral broadening of the line, is achieved by using an etalon as a reflecting mirror which is tuned antiresonant to the selected single laser line. Gas pressure in the laser chamber is again above 2.5 bar. Outcoupling of the laser beam is achieved by reflection at the one surface of the prism.

In the fifth embodiment, an etalon provides line selection and, therefore, the use of a prism is not necessary. In addition, the etalon acts as an antiresonant outcoupling mirror which suppresses the center of the selected single laser line. The advantage over the first four embodiments is simplicity and a reduction of elements in the resonator which leads to reduced optical losses and increased lifetime. However, the suppression of the second line may be less efficient.

In the sixth embodiment, line selection is achieved through the use of a high reflectivity etalon at one side of the resonator. Further line shaping, i.e., spectral broadening of the line, is achieved by using a second etalon as an outcoupling mirror which is tuned antiresonant to the selected single laser line. Gas pressure in the laser chamber is again above 2.5 bar.

In the seventh embodiment, line selection is achieved through the use of a high reflectivity etalon at one side of the resonator. Further line shaping, i.e., spectral broadening of the line, is achieved by using a higher reflectivity outcoupling mirror (reflectivity R between 8% and 90%) and a gas pressure in the laser chamber above 2.5 bar.

BRIEF DESCRIPTION OF THE FIGURES

FIG. 11 shows both a single selected line from the emission spectrum of a free-running $F_2$-laser without any line broadening effect and also the same selected laser emission line with the line broadening effect caused by the outcoupler etalon.

FIG. 13 shows the emission spectrum of the free-running $F_2$-laser without line selection or line broadening (solid line) and with the line selection and line broadening effects (dashed line) caused by the outcoupler etalon.

DETAILED DESCRIPTION OF THE INVENTION

Figure 1:
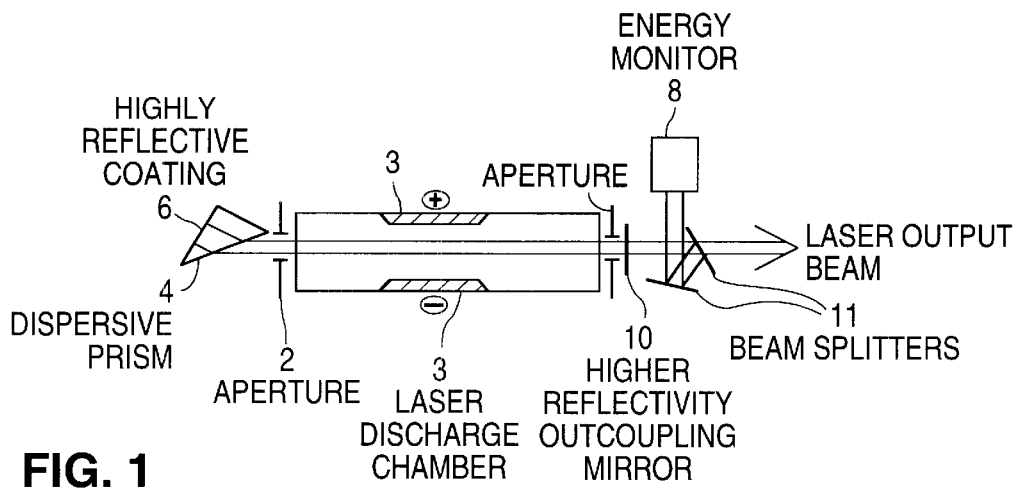
FIG. 1 shows a first preferred embodiment of the present invention.
Figure 2:
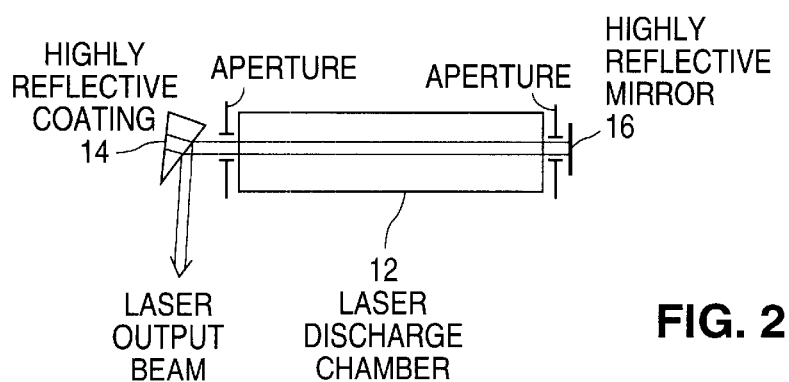
FIG. 2 shows a second preferred embodiment of the present invention.
Figure 3:
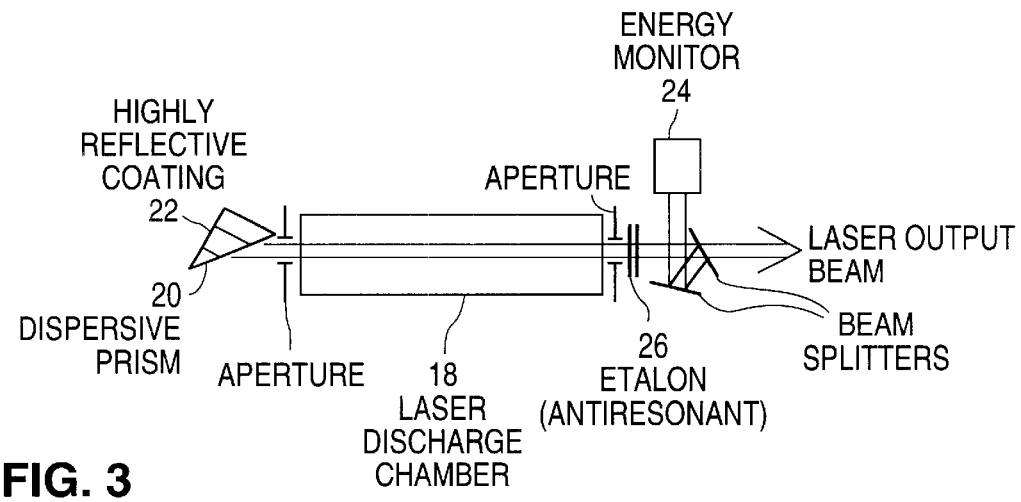
FIG. 3 shows a third preferred embodiment of the present invention.

The $F_2$-laser of the present invention includes a discharge chamber 2 filled with a laser gas including molecular fluorine. The laser gas may be stimulated to emit radiation through the use of electrodes 3 coupled to a power supply circuit such that a voltage is applied across the electrodes to create a pulsed discharge. A UV-preionization of the electrical discharge may also provided and may be realized by means of an array of spark gaps or by another source of UV-radiation (surface, barrier or corona gas discharges), disposed in the vicinity of at least one of the solid electrodes of the main discharge of the laser. A preferred preionization unit is described in U.S. patent application Ser. No. 09/247,887 which is hereby incorporated by reference in its entirety.

The first preferred embodiment includes a dispersive prism 4 which has a highly reflective coating 6 at its back surface. A highly reflective mirror 10 serves as an output coupler of the beam. The prism 4 may also serve to seal one end of the discharge chamber, while the mirror 10 also serves to seal the other end of the discharge chamber. Also, one of the mirror 10 and the prism 4 may serve to seal one end of the discharge chamber while the other end is sealed by a window. An energy monitor 8 is included in the first embodiment and measures the energy of the output beam of the laser. Beam splitters 11 are also shown.

Figure 8A:
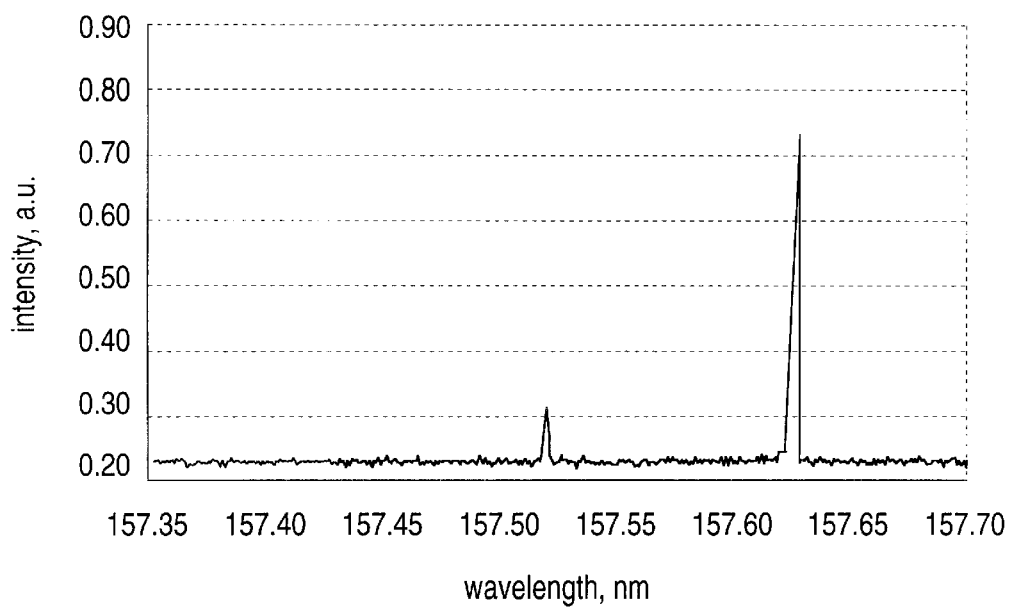
FIG. 8a shows a free-running output emission spectrum of an $F_2$-laser with helium as a buffer gas.
Figure 8B:
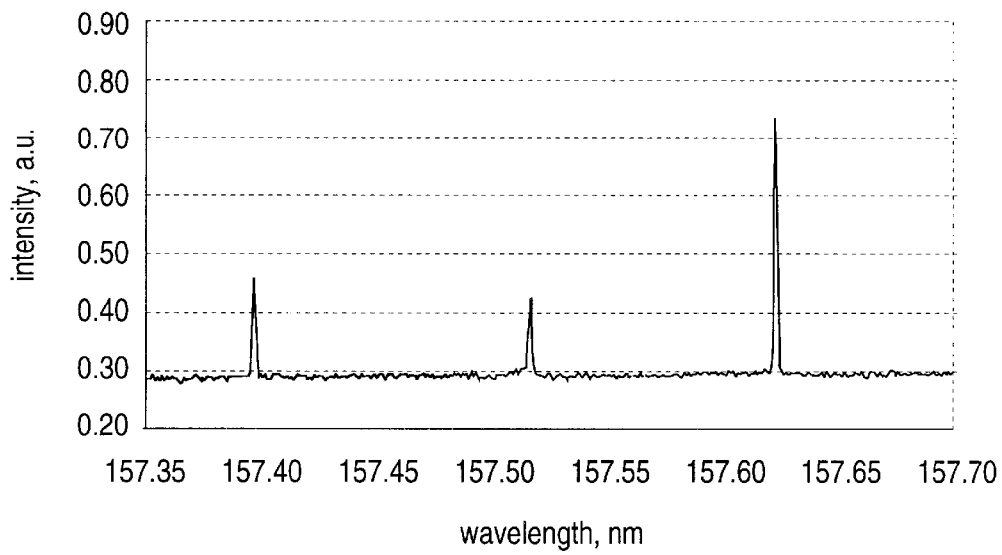
FIG. 8b shows a free-running output emission spectrum of an $F_2$-laser with neon as a buffer gas.

In the first preferred embodiment of the invention, selection of the appropriate spectral line is accomplished by using the dispersive prism 4 in the laser resonator. FIGS. 8a and 8b show the spectra of a free-running $F_2$ laser with helium and neon as buffer gases. Two or three well-defined, relatively narrow spectral lines are present. Due to the wavelength dependent nature of the refractive index of the material of the prism 4, light entering the prism 4 is refracted according to wavelength at various angles. Only a line having a wavelength within a particular range of wavelengths that exit the prism 4 within the acceptance angle of the resonator of the laser will later be outcoupled as output laser beam. In other words, after retroreflecting from the highly reflecting surface 6 at the back of the prism 4, lines of different wavelengths will enter the discharge chamber at different angles to the optical axis of the resonator. Lines having wavelengths within the range of wavelengths reflected within the acceptance angle of the resonator are selected, and all others are not selected or suppressed. The prism 4 may be adjusted so that a desired center wavelength may be aligned parallel to the optical axis so that it suffers the least optical losses and, therefore, dominates the output. This center wavelength is at or near the center of the $F_2$-emission line it is desired to select.

Figure 9A:
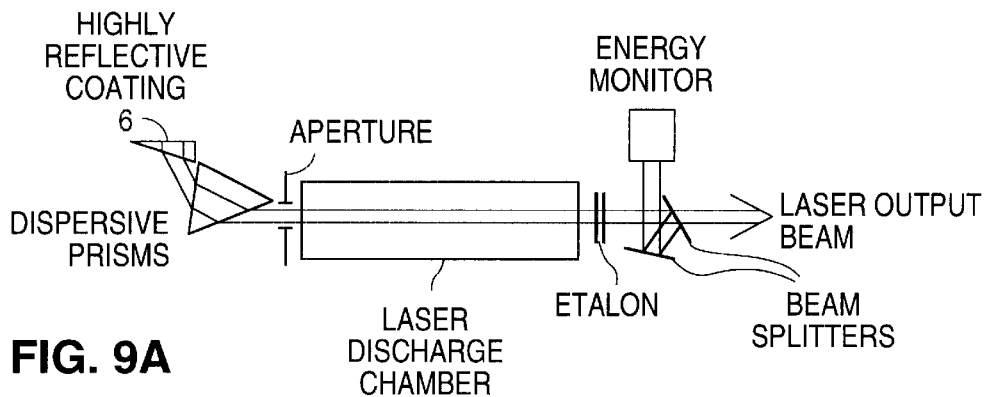
FIG. 9a shows a further preferred embodiment of the present invention.
Figure 9B:
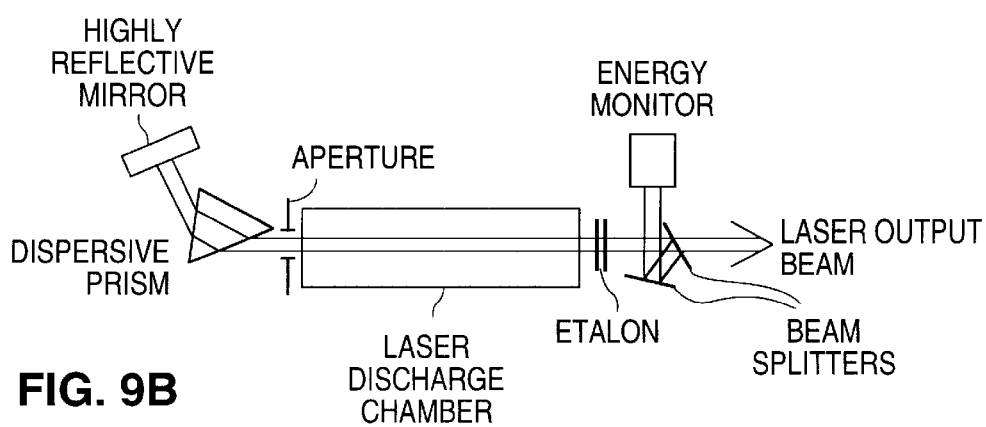
FIG. 9b shows a still further preferred embodiment of the present invention.
Figure 10A:
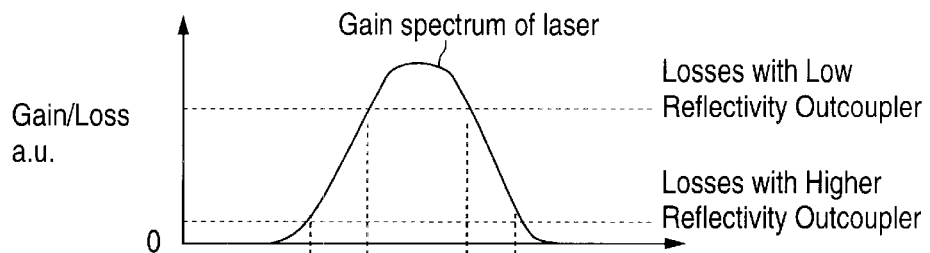
FIG. 10a shows the gain/loss spectrum of a single selected line of an F-2 laser as a function of wavelength. The top dashed line indicates the gain spectrum in the case where a low reflectivity outcoupler is used and the bottom dashed line indicates the gain spectrum in the case where a high reflectivity outcoupler is used.
Figure 10B:
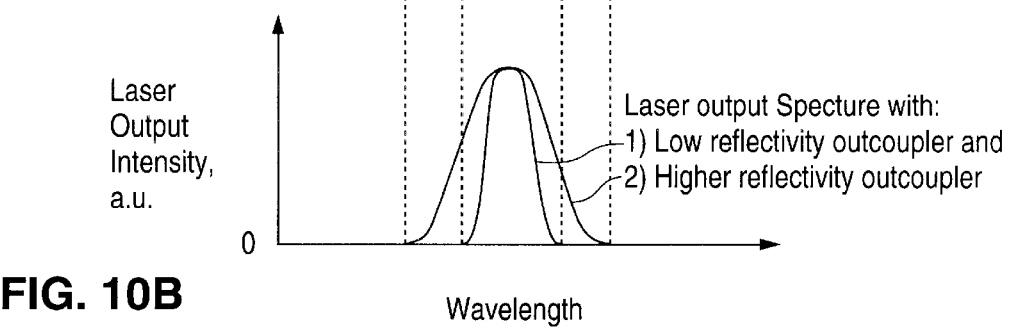
FIG. 10b shows the laser output intensity of an F2 laser as a function of wavelength given the use of two different outcouplers. The figure graphically illustrates that the use of a high reflectivity outcoupler has the effect of broadening the laser output spectrum as compared with the use of a low reflectivity outcoupler.

Alternatively, in order to increase the wavelength separation effect, one may use multiple (two or more) prisms as shown in FIG. 9a. Also, the use of a separate highly reflective mirror instead of a highly reflective coating on the prism side is shown in FIG. 9b. Such a separate highly reflective mirror can be used in combination with multiple prisms as well. An advantage of the separate mirror is that it can be manufactured more readily than the prism. Therefore, it is less expensive to replace. At the same time, the use of a separate mirror increases the number of optical surfaces that the beam traverses, thus increasing both optical losses and wavelength dispersion. Consequently, a decision on the number of prisms and whether to use a separate mirror is dependent on the total magnitude of the dispersion required to achieve reliable selection of a single line.

All of the above considerations hold for the embodiments of FIGS. 1–4.

Conventionally, excimer lasers employ low reflectivity outcoupling mirrors (reflectivity <8%) because of the high gain of the excimer. This is also the case for the $F_2$ excimer laser. Because laser oscillations only occur in the portion of the spectral gain curve in which there is a net gain, increasing the reflectivity of the outcoupling mirror leads to a broader spectral bandwidth for the single line $F_2$ laser output. Accordingly, the reflectivity of the outcoupling mirror should preferably be within the range of 8% to 90%. While the reflectivity of the outcoupling mirror should be no less than 8%, it may substantially higher and may be chosen to be above 30%, 50%, or 70%.

Further, the spectral bandwidth of a selected emission line is dependent in part on the laser chamber pressure and the reflectivity of the outcoupling mirror, if present. Accordingly, the embodiments of the present invention below function better when the laser chamber pressure is relatively high. As our experience confirms, the spectral bandwidth of the selected laser line increases with increasing chamber pressure; therefore, for all embodiments of the present invention, the laser chamber pressure should preferably be above 2.5 bar.

In the second preferred embodiment, higher reflectivities for the outcoupling mirror of FIG. 1 can be used (reflectivity of 90% to 100%). The mirror 16 acts as a high reflector. Outcoupling is achieved through Fresnel reflection or coating at one of the surfaces of the dispersive prism in FIG. 2. The spectral width of the laser output is broader than in the first embodiment because of the reduced total losses in the cavity.

In the third preferred embodiment, after a single spectral line has been selected in a manner similar to that of the first embodiment, the spectral bandwidth of the single line is broadened by the use of an optical etalon 26 in place of a conventional outcoupler mirror, as explained below.

Figure 11:
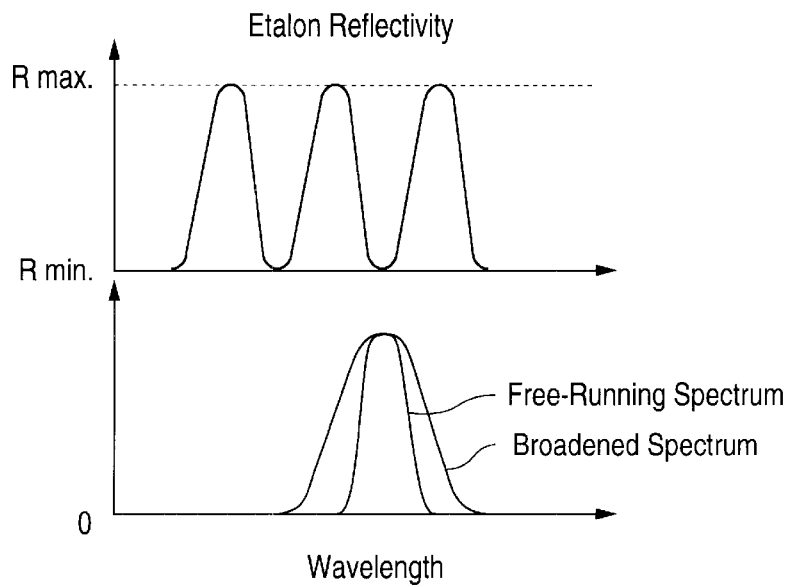
FIG. 11 shows in its top graph the reflectivity of an outcoupler etalon as a function of wavelength in the vicinity of an $F_2$-laser emission line. In its bottom graph.

The reflectivity of the etalon R versus the optical frequency γ of the laser beam is shown in FIG. 11. It is represented by the function $R(\gamma) \sim F \sin^2(\pi\gamma/\gamma_0)/(1+F \sin^2(\pi\gamma/\gamma_0))$, where $F=4R/(1-R)^2$ is the finesse factor of the etalon, $\gamma_0$ is the free spectral range (FSR) of the etalon, $\gamma_0=1/(2nL)$ [cm$^{-1}$], where n is the refractive index of the etalon gap material and L is the spacing of the etalon 26 in centimeters. The finesse factor F relates to the finesse F since $F=\pi\sqrt{F}/2$. Spectral components having frequencies close to the minimum of the etalon's reflectivity R suffer the greatest losses in the resonator and, therefore, are suppressed. Spectral components having frequencies close to the maximum of the etalon's reflectivity R experience the lowest losses in the resonator and, therefore, are relatively enhanced. Therefore, if the FSR of the etalon is approximately equal to the linewidth of the free running laser, and the spectral minimum of the etalon's reflectivity is tuned to the spectral maximum of the selected $F_2$ laser line, the output spectral bandwidth is broadened. This is shown in the bottom portion of FIG. 11.

It is clear from this consideration that the spectral reflectivity function of the etalon 26 must not be much wider than the free running linewidth of the single line, in order to enhance the sidebands in the spectrum and yet suppress the center of the line.

The following is an estimate of the etalon finesse and gap thickness needed to satisfy these conditions. The spectral bandwidth of the etalon reflectivity function is FSR/F. Since the linewidth of the free running $F_2$ laser is about 1 pm, the spectral bandwidth of the etalon should be approximately 1 pm. Since the FSR should be large enough for there to be only one reflectivity minimum in the spectrum, at a wavelength of approximately 157 nm, the FSR should be at least 0.4 cm$^{-1}$. This means that the etalon spacing, L, should be no more than about 8.3 mm if the etalon gap is filled with a material having a refractive index of 1.5 (such as $MgF_2$, $CaF_2$, LiF or crystalline quartz). Alternatively, the etalon gap may be filled with inert gas, in which case its thickness should be approximately 12.5 mm. Both of these spacings L are readily achievable. The selection of materials such as $MgF_2$, $CaF_2$ or crystalline quartz is due to fact that those are among the few materials that are transparent at the wavelength of 157 nm.

When the finesse of the etalon is higher, the FSR of the etalon 26 may accordingly be wider.

Another important consideration is the stability of the etalon reflectivity with respect to the variations in ambient conditions, such as temperature. For example, $MgF_2$ has a linear expansion coefficient of 13.7 10$^{-6}$ K$^{-1}$ along c-axis, and a temperature index coefficient of 1.47 10$^{-6}$ K$^{-1}$ for an ordinary beam. This means that in order to maintain the centering of the spectral line with respect to the minimum of the reflection R(γ) within a margin of 10% of FSR, one needs to stabilize the temperature within 0.06 K. $CaF_2$ similarly requires stability within 0.05 K.

It is obvious from the above estimates that the better solution is to use an etalon 26 whose gap is filled with inert gas which is pressure controlled. For inert gases such as nitrogen, the refractive index changes by approximately 300 ppm per 1 bar of pressure. Therefore, where the spacing between reflecting surfaces, L, is 12.5 mm, achieving frequency control within 10% of FSR requires pressure control within 2 mbar of resolution. Preferably, one should use gases with a low refractive index such as helium, in order to relax the requirements for resolution as to pressure control.

Depending on the required maximum reflectivity of the etalon 26, the internal surfaces of the etalon 26 can either be coated with partially reflective coatings, or can be uncoated. In the latter case, the reflectivity of each surface is approximately 4% to 6%, which results in a maximum reflectivity of the etalon of from 16% to 24%. Similar considerations apply to a solid etalon.

In a pressure-tuned etalon, one should preferably use an inert gas such as nitrogen, helium, argon and others, since air is not transparent at wavelengths near 157 nm, primarily due to the presence of oxygen, water vapor and carbon dioxide.

Figure 12:
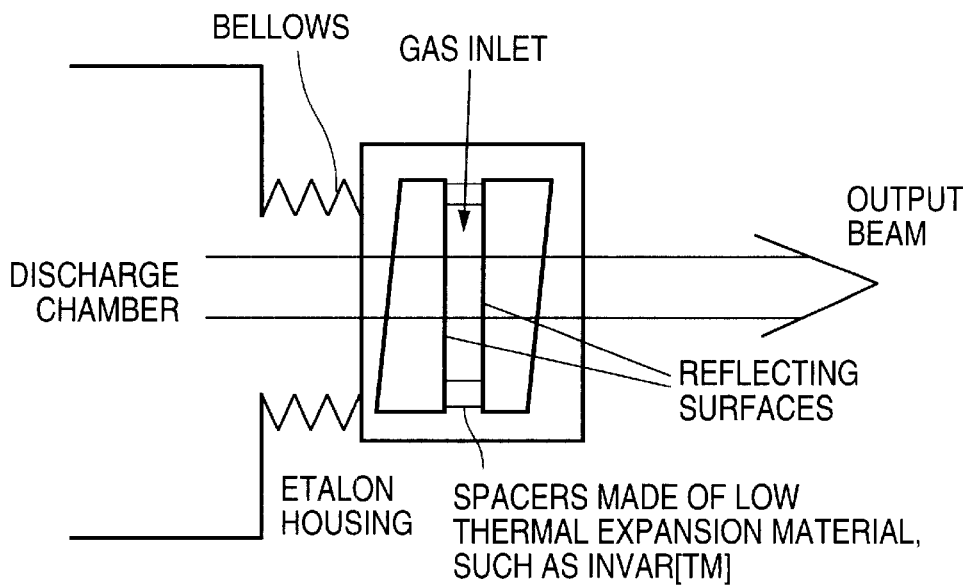
FIG. 12 shows an etalon as an outcoupler for an $F_2$-laser in accord with the present invention.

FIG. 12 shows that such an etalon should preferably act as a seal for the gas discharge chamber, in order to eliminate the need for an additional optical window in the chamber.

Figure 4:
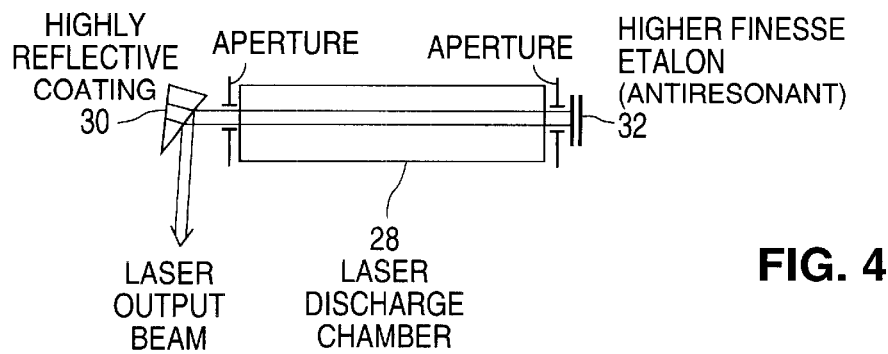
FIG. 4 shows a fourth preferred embodiment of the present invention.
Figure 5:
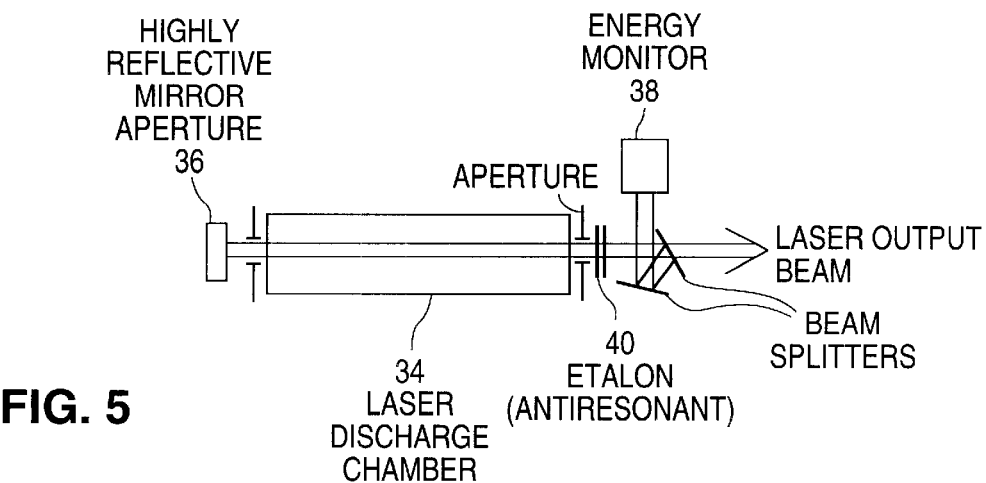
FIG. 5 shows a fifth preferred embodiment of the present invention.

The fourth preferred embodiment acts like the third embodiment, but outcoupling is achieved by reflection at a highly reflecting surface 30 of the prism used for line selection in FIG. 4.

In the fifth preferred embodiment, the etalon 40 is used for both bandwidth broadening, in a fashion similar to that described above, and, simultaneously, for selecting the single spectrum line. The latter is achieved by adjusting the FSR and the wavelength of the maximum reflectivity of the etalon 40 in such a way that at all lines in the free running spectrum the reflectivity is minimal. This can be done for two lines. If three lines are present, the following conditions should be satisfied:

$$(m+\tfrac{1}{2})\gamma_0 = \gamma_1;$$

$$(k+\tfrac{1}{2})\gamma_0 = \gamma_2;$$

$$(j+\tfrac{1}{2})\gamma_0 = \gamma_3;$$

where $\gamma_1$ m, j, k are integers, $\gamma_0$ is the free spectral range of the etalon in the optical frequency domain, $\gamma_1$ is the optical frequency of the line to be selected, and $\gamma_2$ and $\gamma_3$ are optical frequencies of the spectral lines to be suppressed. In the case where-only two lines are present, this set of equations reduces to two equations:

$$(m+\tfrac{1}{2})\gamma_0 = \gamma_1;$$

$$(k+\tfrac{1}{2})\gamma_0 = \gamma_2;$$

where $\gamma_1$ is the optical frequency of the line to be selected. Since the gain at the lines $\gamma_2$ and $\gamma_3$ is much smaller (by a factor of about 1/10) than the gain at $\gamma_1$, the lines at $\gamma_2$ and $\gamma_3$ do not reach a laser oscillation threshold. Therefore, these lines are suppressed completely, while the intense line is only broadened.

Figure 13:
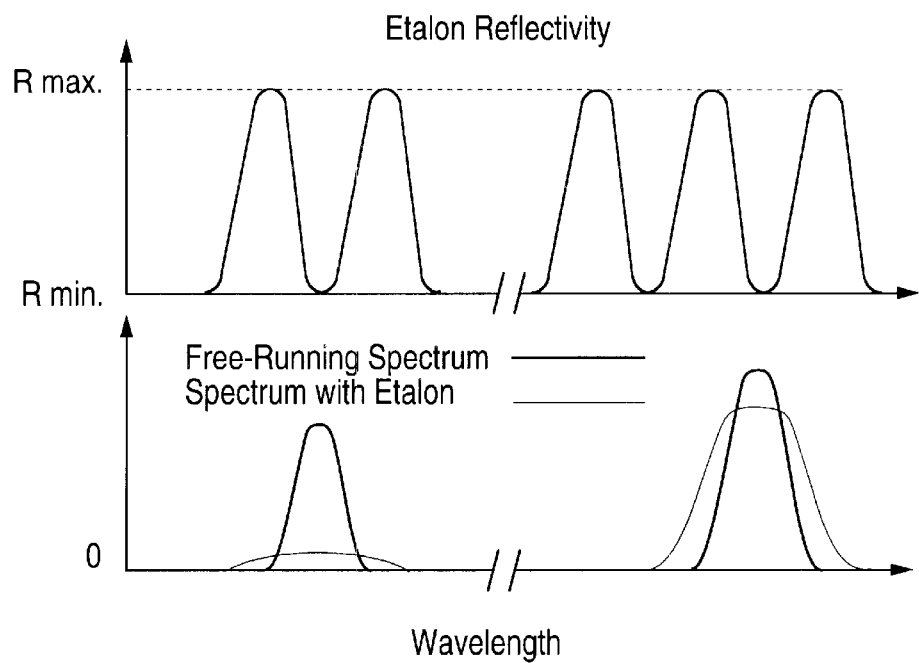
FIG. 13 shows in its top graph the wavelength dependence of the reflectivity of an outcoupler etalon as a function of wavelength in the vicinity of two $F_2$-laser emission lines. In its bottom graph.

FIG. 13 illustrates the above relations schematically. In order to satisfy the needed conditions, the etalon's FSR has to be adjusted either by changing its gap spacing, or by varying the pressure of the gas in the gap, as has been described above. The requirements respecting pressure resolution described above also apply to this case.

An advantage of this embodiment is simplicity, since no prisms are required. However, a possible disadvantage may be less efficient suppression of unwanted lines, leading to residual emission at those wavelengths.

Figure 6:
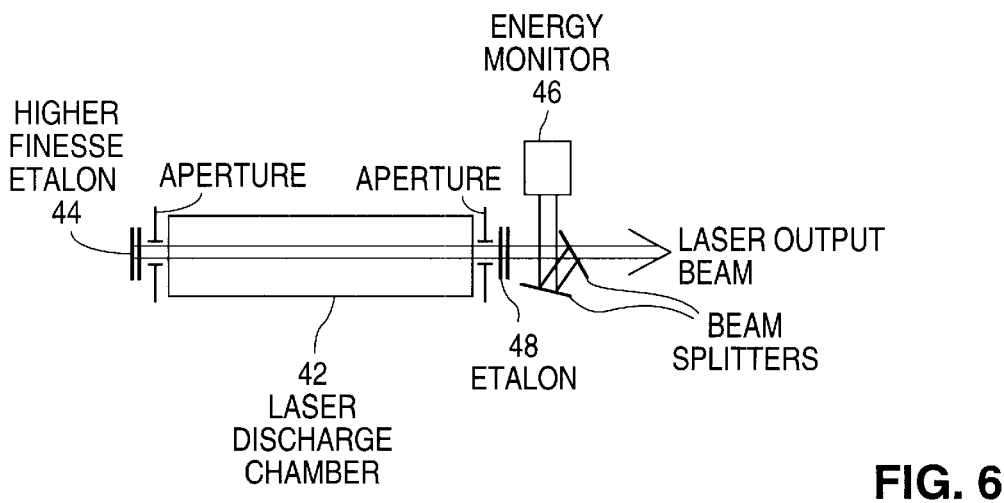
FIG. 6 shows a sixth preferred embodiment of the present invention.
Figure 14:
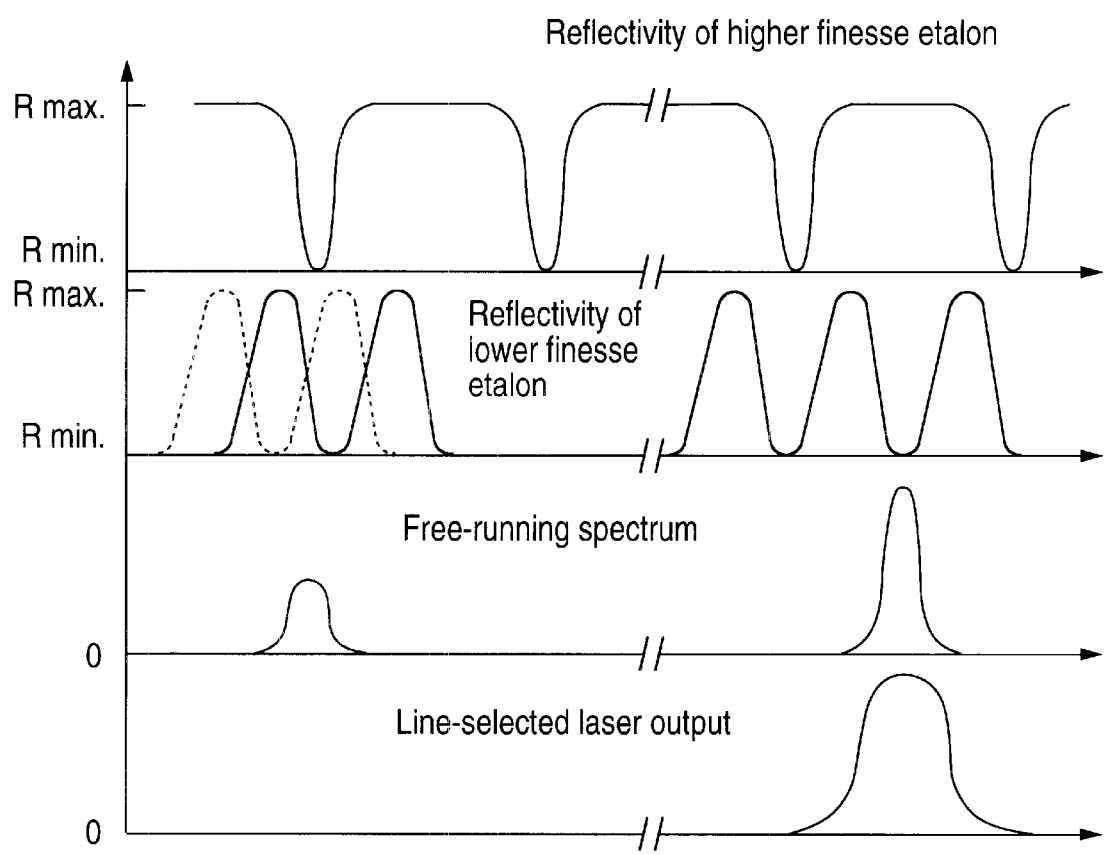
FIG. 14 illustrates the line selecting effect of a higher finesse etalon and the line broadening effect of a lower finesse etalon in accordance with the sixth preferred embodiment of the invention.

In the sixth preferred embodiment, one etalon 44 is used for selecting the single line (left-hand side of FIG. 6) in a fashion similar to that described above. A second etalon outcoupler 48 (right-hand side, of FIG. 6) is employed for bandwidth broadening of the selected line, in a fashion similar to that described for the third embodiment. The advantage of this embodiment is the independence of line selection and line broadening. In FIG. 14 the reflectivity function of the line selecting etalon 44 is schematically shown. The contrast ratio is chosen so that minimum reflectivity occurs at the wavelength of the line which is to be suppressed. The line selecting etalon 44 possesses maximum reflectivity in the wavelength range of the line which is to be selected. On the other hand, the line broadening etalon 48 serves to broaden the selected emission line in a manner also shown in FIG. 14 and described above in conjunction with the third embodiment. The etalon 48 has a reflectivity minimum at the center of the selected emission line and is tuned in a manner described in conjunction with the third embodiment so as to enhance the side portions of the selected emission line relative to the center of the selected line.

Figure 7:
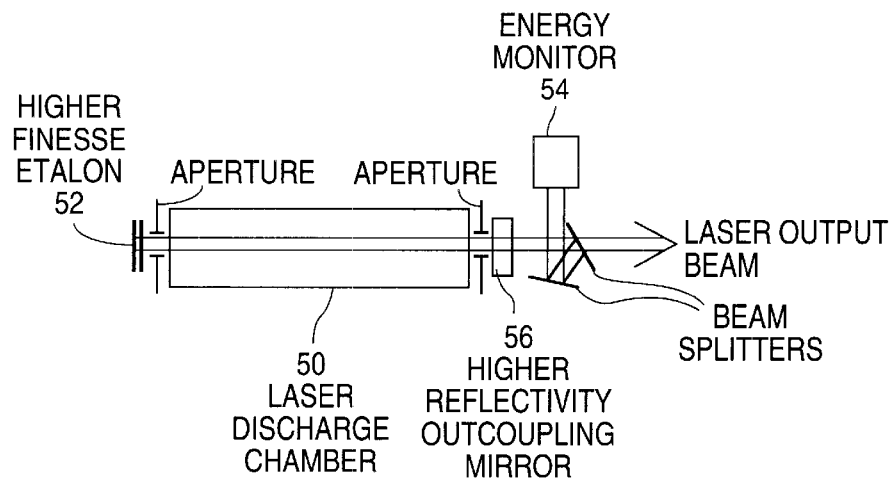
FIG. 7 shows a seventh preferred embodiment of the present invention.

In the seventh preferred embodiment, one etalon 32 is used for selecting the single line (left-hand side of FIG. 7) in a fashion similar to that described above. As in the first embodiment, the bandwidth broadening of the selected line is accomplished by the higher reflectivity of the outcoupling mirror 56 as well as the higher gas pressure.

The gas composition for the $F_2$ laser in the above embodiments includes Helium or Neon, or a mixture of Helium and Neon, as a buffer gas. The concentration of Fluorine in the gas ranges from 0.003% to 1.00%. Xenon and/or Argon may be added in order to increase the energy stability of the laser output. The concentration of Xenon or Argon in the mixture may range from 0.0001% to 0.1%.

In all seven embodiments described above, one can preferably include one or more apertures of a size approximately equal to the size of the generated beam. The purpose of such apertures is to reduce the amount of amplified spontaneous emission generated in the gas discharge chamber. Reducing this parasitic emission is advantageous because such emission does not generally possess the properties of the desired laser oscillations. Therefore, if not excluded by an aperture, such parasitic emission can deteriorate the quality of the output beam, including the beam's spectral purity and divergence. Generally, any of the embodiments described herein may be varied by adding one or more apertures for excluding this parasitic emission.

Wavefront curvature of the beam may also be compensated by using a cylindrical lens within the resonator (see U.S. patent application Ser. No. 09/073,070 filed Apr. 29, 1998). The etalons used in some embodiments of the present invention are generally sensitive to the wavefront curvature of the beam. Thus, one or more cylindrical lenses placed in the resonator can provide a more collimated beam at the etalon. Moreover, wavefront curvature compensation can be achieved through the use of one or more curved resonator mirrors.

The scope of the present invention is meant to be that set forth in the claims that follow, and equivalents thereof, and is not limited to any of the specific embodiments described above.

What is claimed is:

1. A method for selecting a narrow spectral band from the emission spectrum of an excimer laser gas volume and broadening the spectrum of said narrow spectral band, comprising the steps of:

generating an emission spectrum by stimulating the emission of radiation from said excimer laser gas volume;

optically resonating at least a portion of said emission spectrum along an optical path;

selecting a narrow spectral band of wavelengths from within said emission spectrum by suppressing propagation of other portions of said emission spectrum along said optical path;

broadening said narrow spectral band by enhancing an intensity of the other portions of said narrow spectral band relative to an intensity of a center portion of said narrow spectral band; and outputting a laser beam, and wherein said laser beam has a reduced temporal coherence length due to said broadening of said narrow spectral band such that modulation due To effects of speckle is reduced.

2. A method as recited in claim 1 wherein said step of selecting a narrow spectral band includes using a dispersive prism arranged so as to suppress the propagation of other portions of said emission spectrum along said optical path, and further wherein said step of broadening said narrow spectral band includes using an etalon arranged so as to enhance its reflectivity at said outer portions of said narrow spectral band relative to its reflectivity at said center portion of said narrow spectral band.

3. A method as recited in claim 1 wherein said step of selecting a narrow spectral band includes using an etalon arranged so as to suppress the propagation of other portions of said emission spectrum along said optical path, and further wherein said step of broadening said narrow spectral band includes using an etalon arranged so as to enhance its reflectivity at said outer portions of said narrow spectral band relative to its reflectivity at said center portion of said narrow spectral band.

4. A method as recited in claim 1 wherein said step of selecting a narrow spectral band includes using a dispersive prism arranged so as to suppress the propagation of other portions of said emission spectrum along said optical path, and further wherein said step of broadening said narrow spectral band includes using a mirror having a reflectivity greater than 8% and arranged so as to enhance said outer portions of said narrow spectral band relative to said center portion of said narrow spectral band.

5. A method as recited in claim 1 wherein said step of selecting a narrow spectral band includes using a dispersive prism arranged so as to suppress the propagation of other portions of said emission spectrum along said optical path, and further wherein said step of broadening said narrow spectral band includes using a mirror having a reflectivity greater than 30% and arranged so as to enhance said outer portions of said narrow spectral band relative to said center portion of said narrow spectral band.

6. A method as recited in claim 1 wherein said step of selecting a narrow spectral band includes using a dispersive prism arranged so as to suppress the propagation of other portions of said emission spectrum along said optical path, and further wherein said step of broadening said narrow spectral band includes using a mirror having a reflectivity greater than 50% and arranged so as to enhance said outer portions of said narrow spectral band relative to said center portion of said narrow spectral band.

7. A method as recited in claim 1 wherein said step of selecting a narrow spectral band includes using a dispersive prism arranged so as to suppress the propagation of other portions of said emission spectrum along said optical path, and further wherein said step of broadening said narrow spectral band includes using a mirror having a reflectivity greater than 70% and arranged so as to enhance said outer portions of said narrow spectral band relative to said center portion of said narrow spectral band.

8. A method as recited in claim 1 wherein said step of selecting a narrow spectral band includes using a dispersive prism arranged so as to suppress the propagation of other portions of said emission spectrum along said optical path., and further wherein said step of broadening said narrow spectral band includes using a mirror having a reflectivity greater than 90% and arranged so as to enhance said outer portions of said narrow spectral band relative to said center portion of said narrow spectral band.

9. A method as recited in claim 1 wherein said step of selecting a narrow spectral band includes using an etalon arranged so as to suppress the propagation of other portions of said emission spectrum along said optical path, and further wherein said step of broadening said narrow spectral band includes using a mirror having a reflectivity greater than 8% and arranged so as to enhance said outer portions of said narrow spectral band relative to said center portion of said narrow spectral band.

10. A method as recited in claim 1 wherein said step of selecting a narrow spectral band includes using an etalon arranged so as to suppress the propagation of other portions of said emission spectrum along said optical path, and further wherein said step of broadening said narrow spectral band includes using a mirror having a reflectivity greater than 30% and arranged so as to enhance said outer portions of said narrow spectral band relative to said center-portion of said narrow spectral band.

11. A method as recited in claim 1 wherein said step of selecting a narrow spectral band includes using an etalon arranged so as to suppress the propagation of other portions of said emission spectrum along said optical path, and further wherein said step of broadening said narrow spectral band includes using a mirror having a reflectivity greater a than 50% and arranged so as to enhance said outer portions of said narrow spectral band relative to said center portion of said narrow spectral band.

12. A method as recited in claim 1 wherein said step of selecting a narrow spectral band includes using an etalon arranged so as to suppress the propagation of other portions of said emission spectrum along said optical path, and further wherein said step of broadening said narrow spectral band includes using a mirror having a reflectivity greater than 70% and arranged so as to enhance said outer portions of said narrow spectral band relative to said center portion of said narrow spectral band.

13. A method as recited in claim 1 wherein said step of selecting a narrow spectral band includes using an etalon arranged so as to suppress the propagation of other portions of said emission spectrum along said optical path, and further wherein said step of broadening said narrow spectral band includes using a mirror having a reflectivity greater than 90% and arranged so as to enhance said outer portions of said narrow spectral band relative to said center portion of said narrow spectral band.

14. A method as recited in claim 2 or claim 9 or claim 10 or claim 11 or claim 12 or claim 13 wherein said etalon has a gap which is filled with an inert gas.

15. A method as recited in claim 14 wherein the pressure of said inert gas is adjusted so as to optimize the reflectivity spectrum of said etalon.

16. The method of claim 1, wherein said broadening step includes reducing modulation due to speckle effects of an image of said beam when using the selected line to treat a workpiece.

17. An apparatus for selecting a narrow spectral band from the emission spectrum of an excimer laser gas volume an broadening the spectrum of said narrow spectral band, comprising:
   means for generating an emission spectrum by stimulating the emission of radiation from said excitner laser gas volume;
   means for optically resonating at least a portion of said emission spectrum along an optical path;
   means for selecting a narrow spectral band of wavelengths from within said emission spectrum by suppressing propagation of other portions of said emission spectrum along said optical path;

means for broadening said narrow spectral band by enhancing an intensity of the other portions of said narrow spectral band relative to an intensity of a center portion of said narrow spectral band; and means for outputting a laser beam, and
wherein said laser beam has a reduced temporal coherence length due to broadening of said narrow spectral band by said broadening means such that modulation due to effects of speckle is reduced.

18. An apparatus as recited in claim 2 wherein said means for selecting a narrow spectral band includes a dispersive prism arranged so as to suppress the propagation of other portions of said emission spectrum along said optical path, and further wherein said means for broadening said narrow spectral band includes an etalon arranged so as to enhance its reflectivity at said outer portions of said narrow spectral band relative to its reflectivity at said center portion of said narrow spectral band.

19. An apparatus as recited in claim 2 wherein said means for selecting a narrow spectral band includes an etalon arranged so as to suppress the propagation of other portions of said emission spectrum along said optical path, and further wherein said means for broadening said narrow spectral band includes an etalon arranged so as to enhance its reflectivity at said outer portions of said narrow spectral band relative to its reflectivity at said center portion of said narrow spectral band.

20. An apparatus as recited in claim 2 wherein said means for selecting a narrow spectral band includes a dispersive prism arranged so as to suppress the propagation of other portions of said emission spectrum along said optical path, and further wherein said means for broadening said narrow spectral band includes a mirror having a reflectivity greater than 8% and arranged so as to enhance said outer portions of said narrow spectral band relative to said center portion of said narrow spectral band.

21. An apparatus as recited in claim 2 wherein said means for selecting a narrow spectral band includes a dispersive prism arranged so as to suppress the propagation of other portions of said emission spectrum along said optical path, and further wherein said means for broadening said narrow spectral band includes a mirror having a reflectivity greater than 30% and arranged so as to enhance said outer portions of said narrow spectral band relative to said center portion of said narrow spectral band.

22. An apparatus as recited in claim 2 wherein said means for selecting a narrow spectral band includes a dispersive prism arranged so as to suppress the propagation of other portions of said emission spectrum along said optical path, and further wherein said means for broadening said narrow spectral band includes a mirror having a reflectivity greater than 50% and arranged so as to enhance said outer portions of said narrow spectral band relative to said center portion of said narrow spectral band.

23. An apparatus as recited in claim 2 wherein said means for selecting a narrow spectral band includes a dispersive prism arranged so as to suppress the propagation of other portions of said emission spectrum along said optical path, and further wherein said means for broadening said narrow spectral band includes a mirror having a reflectivity greater than 70% and arranged so as to enhance said outer portions of said narrow spectral band relative to said center portion of said narrow spectral band.

24. An apparatus as recited in claim 2 wherein said means for selecting a narrow spectral band includes a dispersive prism arranged so as to suppress the propagation of other portions of said emission spectrum along said optical path, and further wherein said means for broadening said narrow spectral band includes a mirror having a reflectivity greater than 90% and arranged so as to enhance said outer portions of said narrow spectral band relative to said center portion of said narrow spectral band.

25. An apparatus as recited in claim 2 wherein said means for selecting a narrow spectral band includes an etalon arranged so as to suppress the propagation of other portions of said emission spectrum along said optical path, and further wherein said means for broadening said narrow spectral band includes a mirror having a reflectivity greater than 8% and arranged so as to enhance said outer portions of said narrow spectral band relative to said center portion of said narrow spectral band.

26. An apparatus as recited in claim 2 wherein said means for selecting a narrow spectral band includes an etalon arranged so as to suppress the propagation of other portions of said emission spectrum along said optical path, and further wherein said means for broadening said narrow spectral band includes a mirror having a reflectivity greater than 30% and arranged so as to enhance said outer portions of said narrow spectral band relative to said center portion of said narrow spectral band.

27. An apparatus as recited in claim 2 wherein said means for selecting a narrow spectral band includes an etalon arranged so as to suppress the propagation of other portions of said emission spectrum along said optical path, and further wherein said means for broadening said narrow spectral band includes a mirror having a reflectivity greater than 50% and arranged so as to enhance said outer portions of said narrow spectral band relative to said center portion of said narrow spectral band.

28. An apparatus as recited in claim 2 wherein said means for selecting a narrow spectral band includes an etalon arranged so as to suppress the propagation of other portions of said emission spectrum along said optical path, and further wherein said means for broadening said narrow spectral band includes a mirror having a reflectivity greater than 70% and arranged so as to enhance said outer portions of said narrow spectral band relative to said center portion of said narrow, spectral band.

29. An apparatus as recited in claim 2 wherein said means for selecting a narrow spectral band includes an etalon arranged so as to suppress the propagation of other portions of said emission spectrum along said optical path, and further wherein said means for broadening said narrow spectral band includes a mirror having a reflectivity greater than 90% and arranged so as to enhance said outer portions of said narrow spectral band relative to said center portion of said narrow spectral band.

30. An apparatus as recited in claim 18 or claim 25 or claim 26 or claim 27 or claim 28 or claim 29 wherein said etalon has a gap which is filled with an inert gas.

31. An apparatus as recited in claim 30 wherein the pressure of said inert gas is adjusted so as to optimize the reflectivity spectrum of said etalon.

32. The excimer laser of claim 17, wherein said emission spectrum includes more than one emission line, and wherein said selecting means selects one wavelength line by increasing the gain at that wavelength line relative to any other wavelength lines, and wherein said broadening means reduces modulation of an image of said selected wavelength line due to speckle effects when using the selected line to treat a workpiece.

33. An excimer laser as recited in claim 32 wherein said gas mixture includes molecular fluorine.

34. An excimer laser as recited in claim 32 wherein said means for broadening said selected wavelength line includes a gas mixture pressure of at least 2.5 bar.

35. An excimer laser as recited in claim 32 wherein said gas mixture is located in a resonant cavity and wherein said means for broadening said selected wavelength line includes an output coupler whose reflectivity is in excess of 8%.

36. The excimer laser of claim 17, wherein said broadening means reduces modulation due to speckle effects of an image of said selected wavelength line when using the selected line to treat a workpiece.

37. A method for selecting an emission line from among a plurality of closely spaced emission lines of a laser gas volume including molecular fluorine and broadening the spectrum of said selected emission line, comprising the steps of:

generating an emission spectrum having a plurality of closely spaced emission lines by using electrodes to energize said laser gas volume;

optically resonating at least some of said closely spaced emission lines along an optical path:

selecting one of said plurality of closely spaced emission lines by suppressing propagation of other emission lines along said optical path;

broadening said selected emission line by enhancing an in intensity of the other portions of said selected emission line relative to an intensity of a center portion of said selected emission line; and outputting a laser beam, and
wherein said laser beam has a reduced temporal coherence length due to said broadening of said selected emission line such that modulation of an image of said laser beam due to effects of speckle is reduced.

38. A method as recited in claim 37 wherein said step of selecting an emission line includes using a dispersive prism arranged so as to suppress the propagation of other emission lines along said optical path, and further wherein said step of broadening said emission line includes using an etalon arranged so as to enhance its reflectivity at said outer portions of said selected emission line relative to its reflectivity at said center portion of said selected emission line.

39. A method as recited in claim 37 wherein said step of selecting an emission line includes using an etalon arranged so as to suppress the propagation of other emission lines along said optical path, and further wherein said step of broadening said emission line includes using an etalon arranged so as to enhance its reflectivity at said outer portions of said selected emission line relative to its reflectivity at said center portion of said selected emission line.

40. A method as recited in claim 37 wherein said step of selecting an emission line includes using a dispersive prism arranged so as to suppress the propagation of other emission lines along said optical path, and further wherein said step of broadening said emission line includes using a mirror having a reflectivity greater than 8% and arranged so as to enhance said outer portions of said selected emission line relative to said center portion of said selected emission line.

41. A method as recited in claim 37 wherein said step of selecting an emission line includes using a dispersive prism arranged so as to suppress the propagation of other emission lines along said optical path, and further wherein said step of broadening said emission line includes using a mirror having a reflectivity greater than 30% and arranged so as to enhance said outer portions of said selected emission line relative to said center portion of said selected emission line.

42. A method as recited in claim 37 wherein said step of selecting an emission line includes using a dispersive prism arranged so as to suppress the propagation of other emission lines along said optical path, and further wherein said step of broadening said emission line includes using a mirror having a reflectivity greater than 50% and arranged so as to enhance said outer portions of said selected emission line relative to said center portion of said selected emission line.

43. A method as recited in claim 37 wherein said step of selecting an emission line includes using a dispersive prism arranged so as to suppress the propagation of other emission lines along said optical path, and further wherein said step of broadening said emission line includes using a mirror having a reflectivity greater than 70% and arranged so as to enhance said outer portions of said selected emission line relative to said center portion of said selected emission line.

44. A method as recited in claim 37 wherein said step of selecting an emission line includes using a dispersive prism arranged so as to suppress the propagation of other emission lines along said optical path, and further wherein said step of broadening said emission line includes using a mirror having a reflectivity greater than 90% and arranged so as to enhance said outer portions of said selected emission line relative to said center portion of said selected emission line.

45. A method as recited in claim 37 wherein said step of selecting an emission line includes using an etalon arranged so as to suppress the propagation of other emission lines along said optical path, and further wherein said step of broadening said emission line includes using a mirror having a reflectivity greater than 8% and arranged so as to enhance said outer portions of said selected emission line relative to said center portion of said selected emission line.

46. A method as recited in claim 37 wherein said step of selecting an emission line includes using an etalon arranged so as to suppress the propagation of other emission lines along said optical path, and further wherein said step of broadening said emission line includes using a mirror having a reflectivity greater than 30% and arranged so as to enhance said outer portions of said selected emission line relative to said center portion of said selected emission line.

47. A method as recited in claim 37 wherein said step of selecting an emission line includes using an etalon arranged so as to suppress the propagation of other emission lines along said optical path, and further wherein said step of broadening said emission line includes using a mirror having a reflectivity greater than 50% and arranged so as to enhance said outer portions of said selected emission line relative to said center portion of said selected emission line.

48. A method as recited in claim 37 wherein said step of selecting an emission line includes using an etalon arranged so as to suppress the propagation of other emission lines along said optical path, and further wherein said step of broadening said emission line includes using a mirror having a reflectivity greater than 70% and arranged so as to enhance said outer portions of said selected emission line relative to said center portion of said selected emission line.

49. A method as recited in claim 37 wherein said step of selecting an emission line includes using an etalon arranged so as to suppress the propagation of other emission lines along said optical path, and further wherein said step of broadening said emission line includes using a mirror having a reflectivity greater than 90% and arranged so as to enhance said outer portions of said selected emission line relative to said center portion of said selected emission line.

50. A method as recited in claim 38 or claim 45 or claim 46 or claim 47 or claim 48 or claim 49 wherein said etalon has a gap which is filled with an inert gas.

51. A method as recited in claim 30 wherein the pressure of said inert gas is adjusted so as to optimize the reflectivity spectrum of said etalon.

52. An apparatus as recited in claim 27 wherein the pressure of said laser gas volume is greater than 2.5 bar.

53. The method of claim 37, wherein said broadening step includes reducing modulation due to speckle effects of image of said selected one of said plurality of closely spaced lines when using the selected line to treat a workpiece.

54. A method of generating laser radiation from an excimer laser, said excimer laser including a lasing gas mixture, said laser radiation for treating a work piece, and said method comprising the steps of:

energizing said gas mixture to generate laser radiation at more than one wavelength line;

selecting one wavelength line by increasing a gain at said selected wavelength line relative to other wavelength lines; and broadening said selected wavelength line to reduce its coherence length so as to reduce modulation due to speckle effects of an image of said selected wavelength line on said work piece.

55. A method as recited in claim 54 wherein said gas mixture includes molecular fluorine.

56. A method as recited in claim 54 wherein said step of selecting one wavelength line is performed using a dispersive prism.

57. A method as recited in claim 54 wherein said step of selecting one wavelength line is performed using an etalon.

58. A method as recited in claim 54 wherein said step of broadening said selected wavelength line includes setting the pressure of the gas mixture to be at least 2.5 bar.

59. A method as recited in claim 54 wherein said gas mixture is located in a resonant cavity and wherein said step of broadening said selected wavelength line includes providing an output coupler whose reflectivity is in excess of 8%.

60. A method as recited in claim 49 wherein said step of broadening said selected wavelength line includes using an etalon arranged to have a lower reflectivity in the central portion of said selected wavelength line and a higher reflectivity in the outer portions of said selected wavelength line.

61. A method as recited in claim 60 wherein said etalon is arranged so that the free spectral range thereof is about equal to the line width of the selected wavelength line in a free running laser.

62. A method as recited in claim 54 wherein said steps of wavelength line selection and wavelength line broadening are performed using only one etalon.

* * * * *